(12) United States Patent
Sekiguchi et al.

(10) Patent No.: US 10,994,612 B2
(45) Date of Patent: May 4, 2021

(54) AGENT SYSTEM, AGENT CONTROL METHOD, AND STORAGE MEDIUM

(71) Applicant: HONDA MOTOR CO., LTD., Tokyo (JP)

(72) Inventors: Atsushi Sekiguchi, Wako (JP); Hiroshi Sugihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/589,183

(22) Filed: Oct. 1, 2019

(65) Prior Publication Data
US 2020/0108720 A1    Apr. 9, 2020

(30) Foreign Application Priority Data

Oct. 9, 2018 (JP) .............................. JP2018-191294

(51) Int. Cl.
*B60K 35/00* (2006.01)
*G06F 3/14* (2006.01)
(Continued)

(52) U.S. Cl.
CPC ................ *B60K 35/00* (2013.01); *G06F 3/14* (2013.01); *G10L 15/22* (2013.01); *H04R 1/025* (2013.01); *H04R 1/08* (2013.01); *B60K 2370/148* (2019.05); *B60K 2370/152* (2019.05); *B60K 2370/1575* (2019.05); *B60K 2370/167* (2019.05); *B60K 2370/175* (2019.05); *B60K 2370/182* (2019.05); *G10L 2015/223* (2013.01); *H04R 2499/13* (2013.01)

(58) Field of Classification Search
CPC . B60R 11/0247; B60R 11/0217; G10L 15/08; G10L 2015/088; G10L 15/22; G10L 2015/223; B60K 35/00; B60K 2370/1575; B60K 2370/167; B60K 2370/175; B60K 2370/152; B60K 2370/182; B60K 2370/148; H04R 1/025; H04R 1/08; H04R 2499/13
USPC ........................................................ 381/86
See application file for complete search history.

(56) References Cited

U.S. PATENT DOCUMENTS

2016/0185290 A1* 6/2016 Someda ............. G01C 21/3629
                                                           701/36
2020/0050345 A1* 2/2020 Mugura .................... G06F 3/14

FOREIGN PATENT DOCUMENTS

JP          2006-196941       7/2006

\* cited by examiner

*Primary Examiner* — Vivian C Chin
*Assistant Examiner* — Douglas J Suthers
(74) *Attorney, Agent, or Firm* — Amin, Turocy & Watson, LLP

(57) ABSTRACT

An agent system includes a microphone configured to collect a sound of a vehicle interior, a speaker configured to output a sound to the vehicle interior, a recognizer configured to recognize a meaning of the sound collected, an agent controller configured to generate an agent sound for speaking to an occupant of a vehicle on the basis of the meaning recognized and cause the agent sound to be output to the speaker so that a sound image of the generated agent sound is localized at a prescribed position, and a travel environment acquirer configured to acquire a travel environment of the vehicle, wherein the agent controller causes an aspect in which the sound image of the agent sound is localized to be changed when the travel environment of the vehicle acquired by the travel environment acquirer is changed or is predicted to be changed in the future.

4 Claims, 8 Drawing Sheets

(51) Int. Cl.
*G10L 15/22* (2006.01)
*H04R 1/02* (2006.01)
*H04R 1/08* (2006.01)

FIG. 4

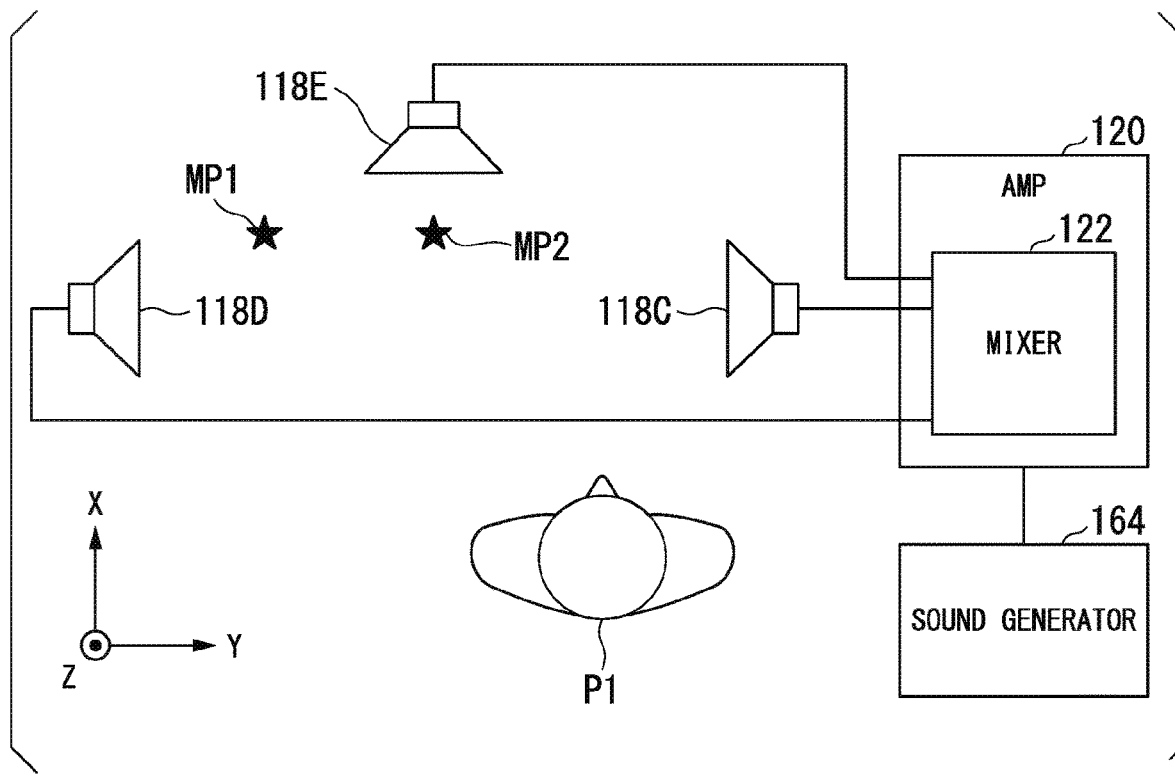

| COMMAND | CONTROL DETAILS |
|---|---|
| TURN ON RADIO | APPLICATION CONTROL: RADIO APPLICATION IS EXECUTED |
| TURN ON HEATING | EQUIPMENT CONTROL: AIR CONDITIONER IS ACTIVATED |
| DISTANCE TO TOKYO STATION? | SOUND CONTROL: "*** [km] FROM HERE." DISPLAY CONTROL: IMAGE OF ROUTE TO TOKYO STATION IS DISPLAYED |
| NEAR RESTAURANTS? | SOUND CONTROL: NUMBER OF NEAR RESTAURANTS IS ***." DISPLAY CONTROL: IMAGE OF LIST OF RESTAURANTS IS DISPLAYED |
| ... | ... |

AGENT SYSTEM, AGENT CONTROL METHOD, AND STORAGE MEDIUM

CROSS-REFERENCE TO RELATED APPLICATION

Priority is claimed on Japanese Patent Application No. 2018-191294, filed Oct. 9, 2018, the content of which is incorporated herein by reference.

BACKGROUND

Field of the Invention

The present invention relates to an agent system, an agent control method, and a storage medium.

Description of Related Art

Conventionally, an audio system for receiving settings of positions at which sound images (sound sources) of audio sounds output from a plurality of speakers installed in a vehicle are localized (hereinafter referred to as sound image localization positions) from a user and controlling audio signals to be output to the speakers so that the sound images of the audio sounds are localized at the received localization positions is known (for example, Japanese Unexamined Patent Application, First Publication No. 2006-196941).

SUMMARY

However, controlling a sound image localization position on the basis of a travel environment of a vehicle is not taken into consideration in the conventional technology. Therefore, appropriate driving support based on a sound for an occupant is not performed.

An aspect of the present invention has been made in view of such circumstances and an objective of the present invention is to provide an agent system, an agent control method, and a storage medium for performing driving support for an occupant more appropriately.

An agent system, an agent control method, and a storage medium according to the present invention adopt the following configurations.

(1): According to an aspect of the present invention, there is provided an agent system including: a microphone configured to collect a sound of a vehicle interior; a speaker configured to output a sound to the vehicle interior; a recognizer configured to recognize a meaning of the sound collected by the microphone; an agent controller configured to generate an agent sound for speaking to an occupant of a vehicle on the basis of the meaning recognized by the recognizer and cause the agent sound to be output to the speaker so that a sound image of the generated agent sound is localized at a prescribed position; and a travel environment acquirer configured to acquire a travel environment of the vehicle, wherein the agent controller causes an aspect in which the sound image of the agent sound is localized to be changed when the travel environment of the vehicle acquired by the travel environment acquirer is changed or is predicted to be changed in the future.

(2): In the above-described aspect (1), the agent system further includes a display configured to display an image, wherein the agent controller causes an agent image of an aspect of speaking to the occupant to be displayed on the display and causes the agent sound to be localized at a position associated with a display position of the agent image when a stopped state of the vehicle has been acquired by the travel environment acquirer.

(3): In the above-described aspect (2), the agent controller causes the agent sound to be moved in a traveling direction of the vehicle when the vehicle is traveling or is predicted to travel in the future on the basis of the travel environment of the vehicle acquired by the travel environment acquirer.

(4): In the above-described aspect (3), the agent controller causes a display position of the agent image displayed on the display to be moved in association with movement of a sound image localization position when the sound image localization position of the agent sound is moved in the traveling direction of the vehicle.

(5): In the above-described aspect (2), the display includes at least a first display and a second display disposed at a position closer to a field of view when the occupant monitors surroundings of the vehicle than the first display and the agent controller causes the agent image displayed on the first display to be moved to the second display and causes a sound image localization position of the agent sound to be moved in association with movement of the agent image when the vehicle is traveling or is predicted to travel in the future on the basis of the travel environment of the vehicle acquired by the travel environment acquirer.

(6): In the above-described aspect (2), the display includes at least a first display and a second display disposed at a position closer to a field of view when the occupant monitors surroundings of the vehicle than the first display and the agent controller causes the agent image displayed on the second display to be moved toward the first display and causes a sound image localization position of the agent sound to be moved in association with movement of the agent image when the vehicle has been switched from manual driving to automated driving by means of the travel environment acquirer.

(7): According to another aspect of the present invention, there is provided an agent control method including: recognizing, by a computer, a meaning of a sound collected by a microphone configured to collect the sound of a vehicle interior; generating, by the computer, an agent sound for speaking to an occupant of a vehicle on the basis of the recognized meaning; causing, by the computer, the agent sound to be output to a speaker in the vehicle interior so that a sound image of the generated agent sound is localized at a prescribed position; acquiring, by the computer, a travel environment of the vehicle; and causing, by the computer, an aspect in which the sound image of the agent sound is localized to be changed when the acquired travel environment of the vehicle is changed or is predicted to be changed in the future.

(8): According to still another aspect of the present invention, there is provided a computer-readable non-transitory storage medium storing a program for causing a computer to: recognize a meaning of a sound collected by a microphone configured to collect the sound of a vehicle interior; generate an agent sound for speaking to an occupant of a vehicle on the basis of the recognized meaning; output the agent sound to a speaker in the vehicle interior so that a sound image of the generated agent sound is localized at a prescribed position; acquire a travel environment of the vehicle; and change an aspect in which the sound image of the agent sound is localized when the acquired travel environment of the vehicle is changed or is predicted to be changed in the future.

According to the above-described aspects (1) to (8), it is possible to perform driving support for an occupant more appropriately by controlling a sound image localization position on the basis of a travel environment of a vehicle.

BRIEF DESCRIPTION OF THE DRAWINGS

FIG. 4 is an explanatory diagram showing the movement of a position where a sound image is localized.

FIG. 5 is a diagram showing an example of details of an answer information DB.

DESCRIPTION OF EMBODIMENTS

Hereinafter, embodiments of an agent system, an agent control method, and a storage medium according to the present invention will be described with reference to the drawings. Hereinafter, an agent system installed in a vehicle (hereinafter referred to as a vehicle M) and having an interactive agent function is used as an example of the agent system. For example, the interactive agent provides various types of information based on a request from the occupant and controls in-vehicle equipment while having a dialogue with the occupant of the vehicle M. For example, the interactive agent is implemented using natural language processing (a process of understanding a structure and meaning of text), a dialogue control process, a search process, and the like in an integrated manner in addition to a sound recognition process of recognizing a sound of the occupant (a process of generating text from a sound). Some or all of these processes are implemented by artificial intelligence (AI) technology. Some or all of components for performing these processes may be provided in a server or the like that can communicate with the vehicle M.

Overall Configuration

Figure 1:
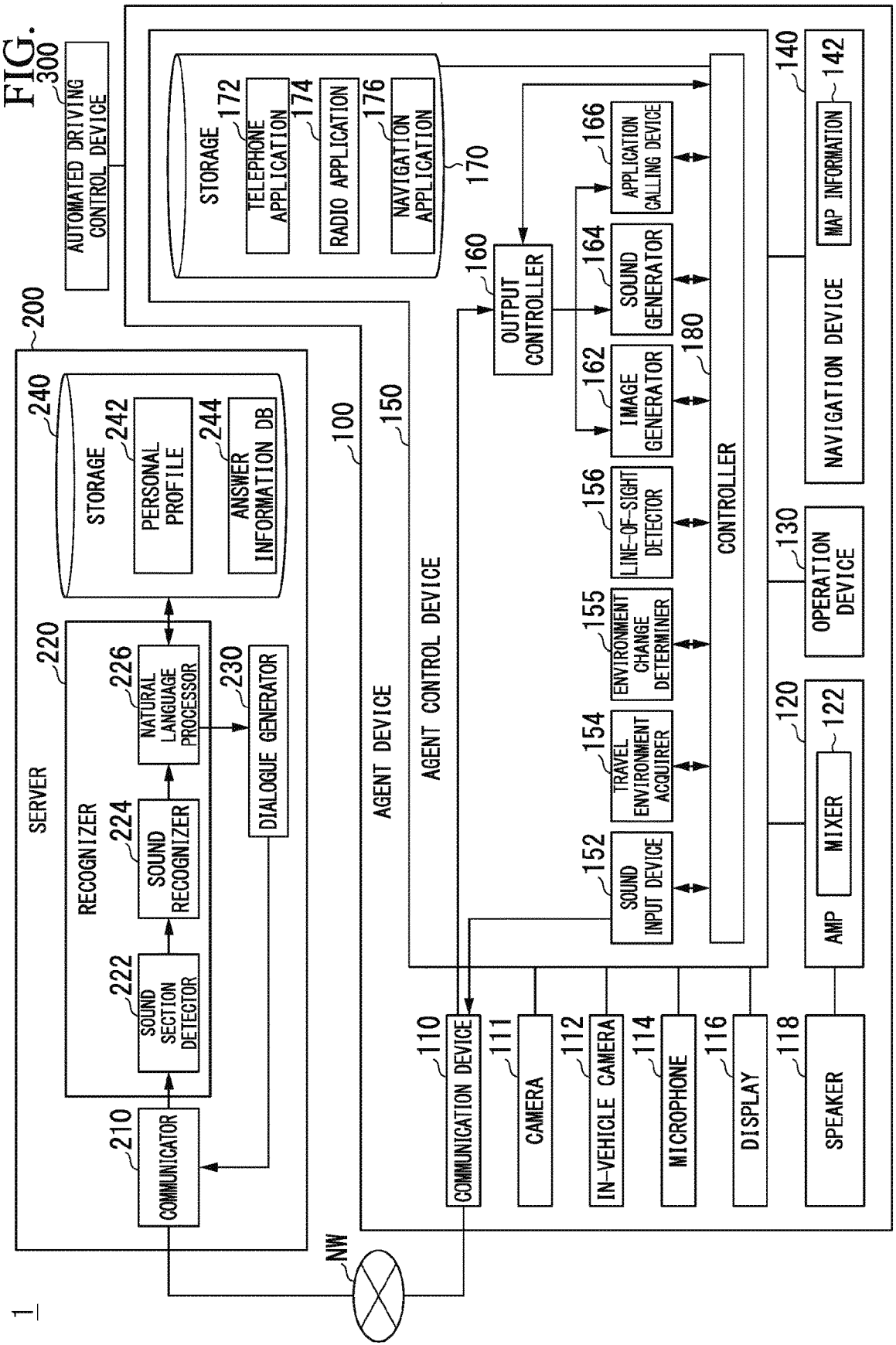
FIG. 1 is a configuration diagram of an agent system including an agent device according to an embodiment.

FIG. 1 is a configuration diagram of an agent system 1 including an agent device according to the embodiment. For example, the agent system 1 includes one or both of an agent device 100 and a server 200 and an automated driving control device 300. For example, the agent device 100 and the server 200 are connected in a state in which data can be transmitted and received through a network NW such as the Internet, a wide area network (WAN), or a local area network (LAN). Although the server 200 can communicate with a plurality of agent devices 100, the server 200 is assumed to communicate with one agent device 100 for convenience of description hereinafter. The automated driving control device 300 is installed in the vehicle M similarly to the agent device 100.

The agent device 100 has a dialogue with the occupant of the vehicle M, makes a request to the server 200 with respect to a request such as a question based on a sound or the like from the occupant, and presents an answer obtained from the server 200 to the occupant in a prescribed output form. Although the occupant is, for example, an occupant sitting in a driver's seat (hereinafter referred to as a driver) in the following description, the occupant may also be an occupant (a passenger) sitting in a passenger seat or a rear seat.

The agent device 100 includes, for example, a communication device 110, a camera 111, an in-vehicle camera 112, a microphone 114, a display 116, a speaker 118, an amplifier (AMP) 120, an operation device 130, a navigation device 140, and an agent control device (an example of an agent controller) 150. These devices and equipment are connected to each other by a multiplex communication line such as a controller area network (CAN) communication line, a serial communication line, or a wireless communication network. The configuration illustrated in FIG. 1 is merely an example, and a part of the configuration may be omitted or another configuration may be added.

For example, the communication device 110 communicates with the server 200, another vehicle, and a terminal device possessed by the occupant via the network NW using a cellular network, a Wi-Fi network, Bluetooth (registered trademark), dedicated short range communication (DSRC), or the like. For example, the communication device 110 transmits a sound input by a sound input device 152, vehicle state information recognized by a travel environment acquirer 154, information about a line of sight of the driver detected by a line-of-sight detector 156, and the like to the server 200. The communication device 110 receives dialogue information from the server 200.

For example, the camera 111 is a digital camera using a solid-state image sensor such as a charge coupled device (CCD) or a complementary metal oxide semiconductor (CMOS). The camera 111 is attached to any position of the vehicle M. When the view in front of the vehicle M is imaged, the camera 111 is attached to an upper part of a front windshield, a rear surface of a rearview mirror, or the like. When the view to the rear is imaged, the camera 111 is attached near a rear bumper. When the view to the side or the rear side is imaged, the camera 111 is attached to an exterior part (for example, an A pillar, a roof, or a side door) of the vehicle body. For example, the camera 111 periodically and iteratively images the surroundings of the vehicle M. The camera 111 may be a stereo camera.

For example, the in-vehicle camera 112 captures an image including the face of the occupant sitting in a seat installed in a vehicle interior of the vehicle M. For example, the in-vehicle camera 112 is a digital camera using a solid-state image sensor such as a CCD or CMOS, for example. For example, the in-vehicle camera 112 images the occupant at a prescribed timing.

The microphone 114 is a sound input device that collects a sound of the vehicle interior. For example, the microphone 114 is installed near a map lamp or on a steering wheel, an instrument panel, or a seat. A plurality of microphones 114 may be installed in the vehicle interior.

The display 116 is installed near the front of the occupant sitting in a seat of the vehicle interior. The speaker 118 is installed near the seat of the vehicle interior or near the display 116. A plurality of displays 116 and a plurality of speakers 118 may be installed in the vehicle interior.

Figure 2:
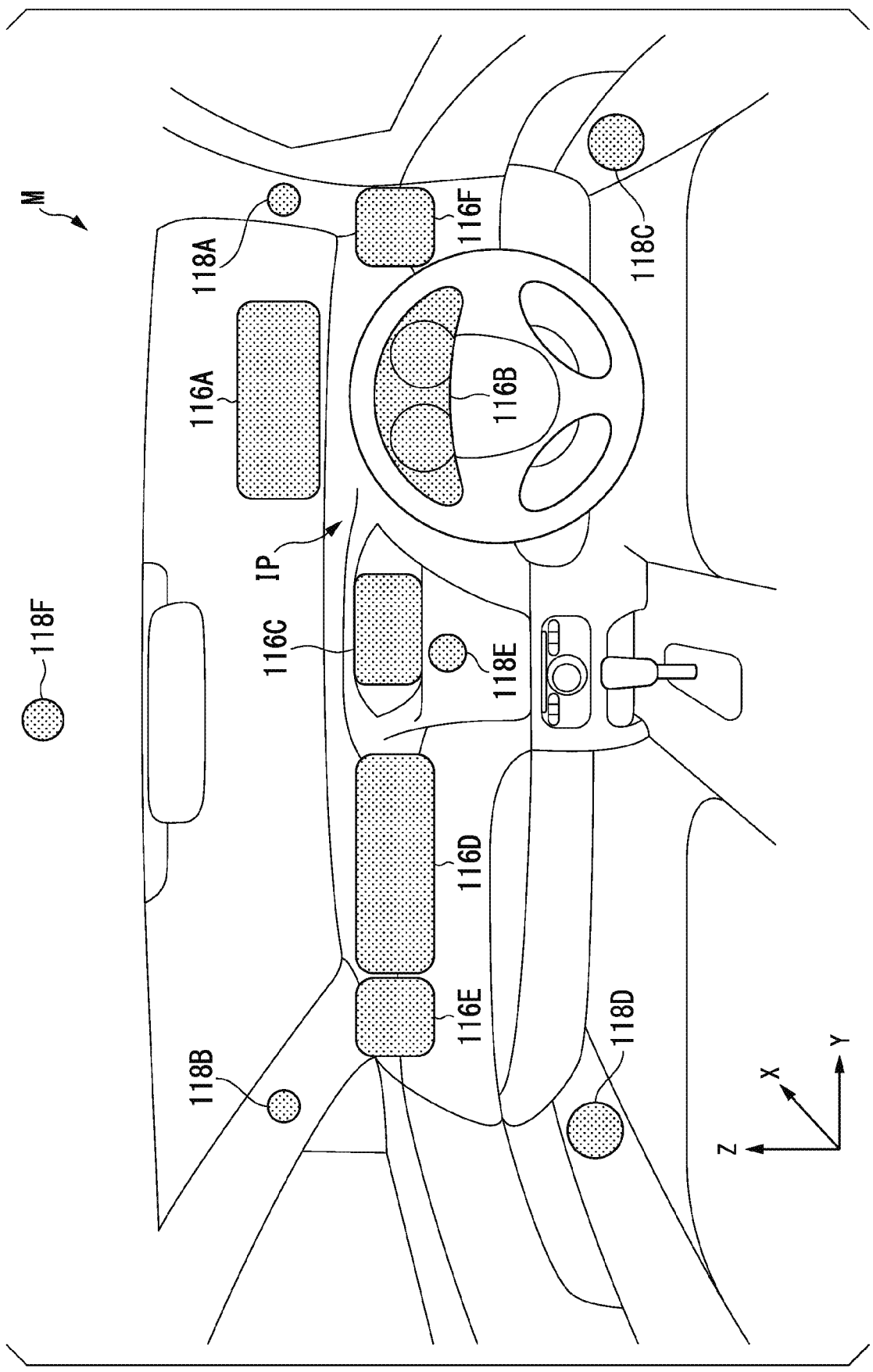
FIG. 2 is a diagram schematically showing displays and speakers installed in a vehicle.

FIG. 2 is a diagram schematically showing displays and speakers installed in the vehicle M. Displays 116A to 116F and speakers 118A to 118F are installed in the vehicle interior of the vehicle M shown in FIG. 2. At least one of the displays 116B to 116F is an example of a "first display". The display 116A is an example of a "second display".

The display 116A is, for example, a head-up display (HUD) device. The HUD device is a device for enabling an image superimposed on scenery to be visually recognized. As an example, the HUD device is a device for allowing the driver to visually recognize a virtual image by projecting light including an image onto a front windshield or a combiner of the vehicle M.

The display 116A is installed at a position closer to a line of sight at the time of manual driving of the driver (for example, a field-of-view range in which a monitoring region of a traveling direction of the vehicle M is viewed) than the displays 116B to 116E Therefore, the driver easily views an image displayed on the display 116A while monitoring surroundings in front of him/her. In contrast, it is impossible or difficult for the driver to view images displayed on the displays 116B to 116F while monitoring the surroundings in front of him/her. For example, an image corresponding to a navigation process to be executed by the navigation device 140, an image generated by the agent control device 150, or the like is displayed on the display 116A.

The display 116B is provided near the front of the driver's seat (for example, a seat closest to the steering wheel) on an instrument panel IP and is installed at a position where the driver can perform visual recognition from a steering wheel gap or through the steering wheel. The display 116B is, for example, a liquid crystal display (LCD) or an organic electro luminescence (EL) display device. The display 116B displays, for example, an image of a speed of the vehicle M, an engine speed, the remaining amount of fuel, a radiator water temperature, a travel distance, or other information, an image generated by the agent control device 150, or the like.

The display 116C is installed near the center of the instrument panel IP. For example, similar to the display 116B, the display 116C is, for example, an LCD, an organic EL display device, or the like. For example, an image corresponding to a navigation process executed by the navigation device 140, an image generated by the agent control device 150, and the like are displayed on the display 116C. The display 116C may display a television program, perform DVD reproduction, or display content such as a downloaded movie.

The display 116D is provided near the front of the passenger seat (a seat adjacent to the driver's seat) in the instrument panel IP. The display 116D displays, for example, a content image of a television program, a movie downloaded from the server 200, or the like, an image generated based on execution of another application, an image generated by the agent control device 150, and the like.

The displays 116B to 116D have a larger viewing angle than the display section 116A. Thus, the agent control device 150 can cause the displays 116B to 116D to display an answer result when the answer result related to the driver's question is displayed, thereby allowing the driver to easily visually recognize the answer result. The agent control device 150 can allow another passenger as well as the driver to easily recognize the answer result by causing the displays 116C and 116D to display the answer result.

For example, the displays 116E and 116F are used as electronic mirrors in a camera monitor system (CMS) installed in the vehicle M. The display 116E displays an image of the left rear side of the vehicle M captured by the camera 111. The display 116F displays an image of the right rear side of the vehicle M captured by the camera 111. The agent control device 150 causes a display selected from the displays 116A to 116F to display an image.

The speakers 118A and 118B are installed, for example, on left and right front window pillars (so-called A-pillars) of the vehicle M. The speaker 118C is installed in the lower part of the driver's seat side door and the speaker 118D is installed in the lower part of the passenger seat side door. The speaker 118E is installed near the display 116C, i.e., near the center of the instrument panel IP.

The speaker 118F is installed near the center of the ceiling in the vehicle interior.

Figure 3:
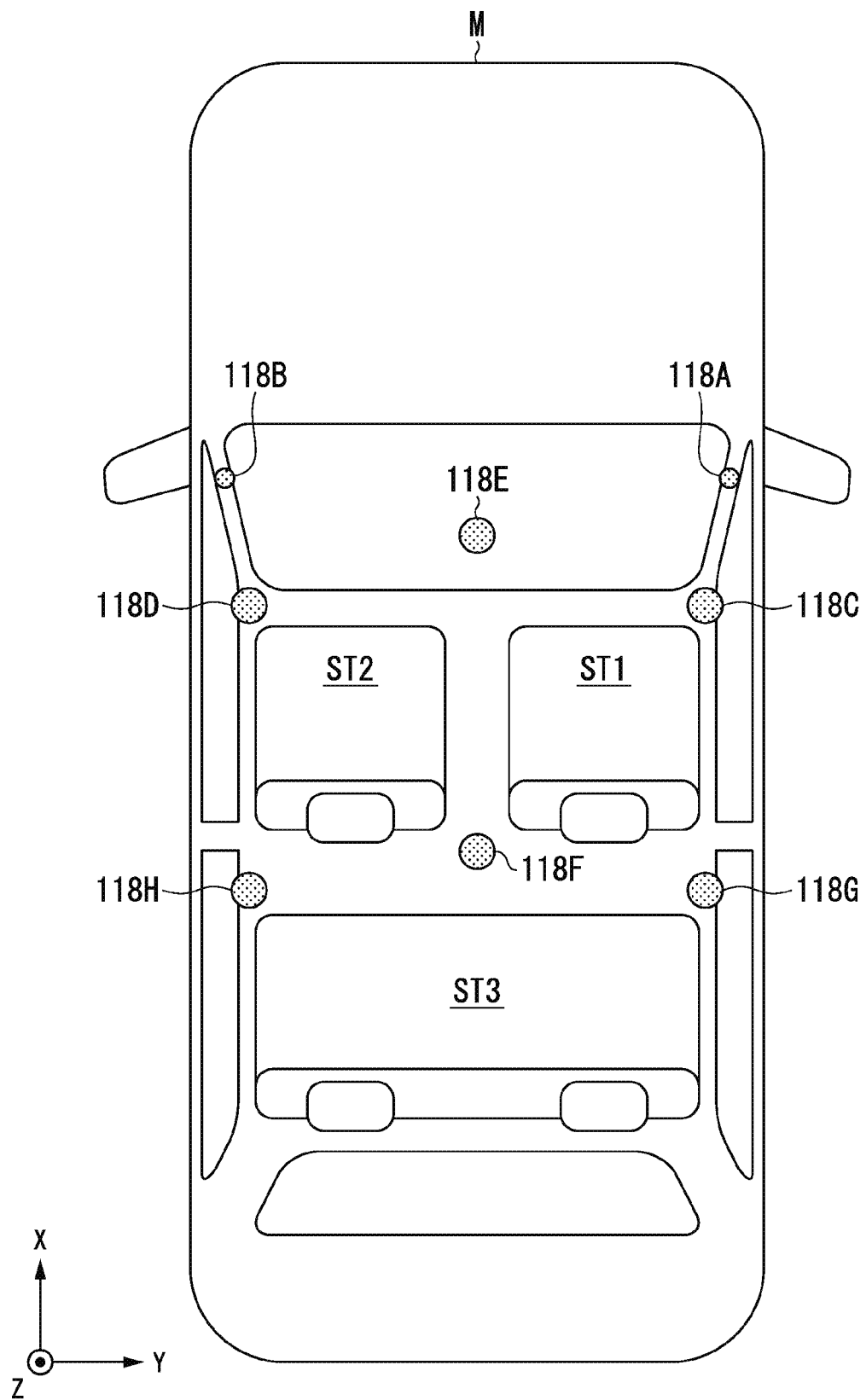
FIG. 3 is an explanatory diagram showing a position of a speaker near a rear seat.

The vehicle M may be provided with a speaker near the rear seat. FIG. 3 is an explanatory diagram showing the position of the speaker near the rear seat. In the example of FIG. 3, in addition to the speakers 118A to 118F shown in FIG. 2, the speakers 118G and 118H are provided near a rear seat ST3 installed behind the driver's seat ST1 and a passenger seat ST2. Specifically, the speakers 118G and 118H are provided in the lower parts of the left and right doors. The speaker 118 may be provided on a window pillar (a so-called B-pillar) provided between the front door and the rear door of the vehicle M or may be provided behind the rear seat.

The AMP 120 adjusts a volume of a sound output from the speaker 118 according to control of the sound generator 164. For example, the AMP 120 can adjust the sound between 0 and 100% with respect to a reference sound volume (a maximum intensity). For example, the AMP 120 includes a mixer 122. The mixer 122 has a function of synthesizing a plurality of input sounds. The mixer 122 has a function of distributing sounds to be output to respective speakers when there are a plurality of speakers 118. The agent control device 150 causes a sound to be output from a speaker selected from the speakers 118A to 118H.

The operation device 130 receives an operation from a passenger. The operation device 130 includes, for example, switches, buttons, keys, and the like. For example, the operation device 130 is provided on a steering wheel or an instrument panel. The operation device 130 may be configured integrally with the display 116 as a touch panel.

The navigation device 140 identifies a position of the vehicle M on the basis of, for example, a signal received from a global navigation satellite system (GNSS) satellite. The navigation device 140 determines a route from the identified position of the vehicle M (or any input position) to a destination input by the occupant using the operation device 130 or the display 116 (hereinafter referred to as a route on a map) with reference to the map information 142. For example, the map information 142 is information in which a road shape is expressed by a link indicating a road and nodes connected by the link. The map information 142 may include a curvature of the road, point of interest (POI) information, or the like. For example, the map information 142 may include information about the center of a lane, information about a boundary of a lane, information about a type of lane, and the like. The map information 142 may include road information, traffic regulation information, address information (an address and a postal code), facility information, telephone number information, and the like. The map information 142 may be updated at any time by the communication device 110 communicating with another device.

The navigation device 140 may perform route guidance using the display 116 on the basis of the route on the map. For example, the navigation device 140 may be implemented by a function of a terminal device such as a smartphone or a tablet terminal possessed by a user. The navigation device 140 may transmit a current position and a destination to the server 200 or a navigation server via the communication device 110 and acquire a route equivalent to the route on the map from the server 200 or the navigation server.

The navigation device 140 may perform route guidance according to map image display by the display 116 or a sound output by a speaker on the basis of a route on a map. The navigation device 140 may implement the function of the navigation device 140 described above according to a function of a navigation application (a navigation application 176) executed by the agent control device 150.

Agent Control Device

For example, the agent control device 150 includes a sound input device 152, a travel environment acquirer 154, an environment change determiner 155, a line-of-sight detector 156, an output controller 160, an image generator 162, a sound generator 164, an application calling device 166, a storage 170, and a controller 180. For example, these components are implemented by a computer processor such as a central processing unit (CPU) executing a program (software). Some or all of these components may be implemented, for example, by hardware (a circuit unit including circuitry) such as large scale integration (LSI), an application specific integrated circuit (ASIC), a field-programmable gate array (FPGA), or a graphics processing unit (GPU) or may be implemented by cooperation between software and hardware. The program may be pre-stored in the storage 170 or stored in a removable storage medium (a non-transitory storage medium) such as a DVD or a CD-ROM. The program may be installed in the storage 170 when the storage medium is mounted in a drive device.

The sound input device 152 receives an input of the occupant's sound collected by the microphone 114.

The sound input device 152 transmits the received sound (sound stream) to the server 200 via the communication device 110. The sound input device 152 may transmit a travel environment (for example, a position of the vehicle M) recognized by the travel environment acquirer 154 to the server 200 in synchronization with a timing at which the sound is transmitted to the server 200. The sound input device 152 may analyze the received sound, determine whether or not the sound includes a specific word, and transmit a sound for a prescribed period of time or a sound section to the server 200 when the sound includes the specific word. The specific word is, for example, a wake word for starting control such as information presentation by the agent device 100.

The travel environment acquirer 154 acquires the travel environment of the vehicle M. For example, the travel environment acquirer 154 analyzes a state of the vehicle on the basis of a position of the vehicle M identified by the navigation device 140, a speed and acceleration, an angular speed around a vertical axis, and a direction of the vehicle M acquired by vehicle sensors installed in the vehicle, and the like. The state of the vehicle M includes, for example, a state such as whether the vehicle M is stopped or traveling and a state such as whether the vehicle is turning right or left or changing lanes. The travel environment acquirer 154 may analyze an image captured by the camera 111 and acquire a lamp lighting state (a traveling permission state or a stop instruction state) of a traffic light near the vehicle M and a relative distance, a relative speed, or the like related to a physical object (for example, another vehicle) near the vehicle M.

The travel environment acquirer 154 may acquire information about a control state from the automated driving control device 300. The information about the control state is, for example, information indicating whether or not the vehicle is in automated driving and information such as a degree of driving support, an event which is being executed, and a target trajectory.

The environment change determiner 155 determines whether or not the travel environment of the vehicle M has been changed on the basis of the travel environment of the vehicle M acquired by the travel environment acquirer 154. For example, the environment change determiner 155 may determine whether or not the travel environment of the vehicle M has been predicted to be changed in the near future of about several seconds.

For example, when the lighting state of the traffic light present in the immediate vicinity of the traveling direction transitions to the traveling permission state in a state in which the vehicle M is in manual driving and the vehicle M is stopped, the environment change determiner 155 determines that the travel environment has been changed because the vehicle M can travel. Also, in contrast, when the lighting state of the traffic light present in the immediate vicinity of the traveling direction transitions to the stop instruction state in a state in which the vehicle M is in manual driving and the vehicle M is traveling, the environment change determiner 155 determines that the travel environment has been changed because the vehicle M is stopped.

The environment change determiner 155 determines that the travel environment has been changed because the vehicle M also needs to be stopped when the state of the preceding traveling vehicle has been changed from the traveling state to the stopped state. Because the vehicle M is likely to be stopped in the near future when the preceding traveling vehicle is decelerating or there is a traffic jam section or an accident vehicle in the traveling direction, the environment change determiner 155 determines that the travel environment of the vehicle M has been predicted to be changed. The environment change determiner 155 may determine whether the travel environment has been changed or whether the travel environment has been predicted to be changed in the near future on the basis of the target trajectory from the automated driving control device 300.

The line-of-sight detector 156 performs an analysis process on an image captured by the in-vehicle camera 112 (hereinafter referred to as an in-vehicle image) to detect the line of sight of the driver. For example, the line-of-sight detector 156 detects a positional relationship between the driver's head and eyes, a combination of a reference point and a moving point in the eyes, and the like from the in-vehicle image using a technique such as template matching. For example, when the reference point is the inner canthus, the moving point is an iris. When the reference point is a corneal reflection region, the moving point is a pupil. The line-of-sight detector 156 derives an orientation of the face on the basis of a position of the eyes with respect to the head. The line-of-sight detector 156 derives an orientation of the line of sight on the basis of a position of the moving point with respect to the reference point. The line-of-sight detector 156 may detect a position where the driver is gazing and a field-of-view region in association with the detected orientation of the line of sight. The field-of-view region is a region within a prescribed range with a gaze position as a center. The line-of-sight detector 156 may estimate a display viewed by the driver from the orientation of the line of sight. Hereinafter, information detected by the line-of-sight detector 156 is referred to as a "line-of-sight position".

The output controller 160 controls information to be provided to the occupant on the basis of information (for example, dialogue information) or the like obtained by the server 200. The dialogue information includes, for example, one or both of pieces of sound information and image information to be provided to the occupant. The information to be provided to the occupant includes, for example, an image to be displayed on the screen by the display 116, a sound to be output by the speaker 118, a function to be executed by an application that implements each function within the vehicle, and the like.

For example, the output controller 160 causes the image generator 162 to generate an image to be provided to the occupant or causes the sound generator 164 to generate a sound to be provided to the occupant on the basis of the dialogue information obtained by the server 200. The output controller 160 performs control so that a display position of the image and a sound image localization position ("localize a simulated sound source" or "a virtual placement of sound source") of the sound are associated with each other.

The image generator 162 generates an image of an anthropomorphized agent that communicates with the occupant within the vehicle (hereinafter referred to as an agent image) according to the control of the output controller 160 or the controller 180 and causes the generated agent image to be displayed at a prescribed display position of the display 116. The agent image is, for example, an image of an aspect in which the agent speaks to the occupant. The agent image includes, for example, at least a face image of a degree to which a facial expression or a face orientation can be recognized by a viewer (the occupant). For example, in the agent image, imitative parts of eyes and noses are represented in the face region and the facial expression and the face orientation are recognized on the basis of positions of parts in the face region. The agent image is perceived three-dimensionally and the viewer may recognize a face orientation of the agent when a head image is included in a three-dimensional space or may recognize an action or behavior of the agent when an image of a main body (a body and limbs) is included. The agent image may be an animation image.

The image generator 162 converts an image obtained by the server 200 into a display aspect (for example, an image size or an image format) for causing the image to be displayed on the display 116 indicated by the output controller 160, and causes the converted image to be displayed on the display 116.

The sound generator 164 generates a speaking sound of the agent image (hereinafter referred to as an agent sound) in correspondence with the dialogue information and a sound other than the agent sound (for example, a sound for content of a radio broadcast, music, a video, and the like) and causes the generated sound to be output from the speaker 118. At this time, the sound generator 164 may perform control for causing a sound image of the agent sound to be localized at a position corresponding to the display position of the agent image using the plurality of speakers 118. For example, the localization of the sound image is a process of determining a spatial position of a sound source to be perceived by the occupant by adjusting a volume and phase of the sound to be transferred to left and right ears of the occupant. For example, the sound image is determined on the basis of original sound characteristics of the sound source, information of an in-vehicle environment, and a head-related transfer function (HRTF). Using such a principle, the sound image can be localized at a prescribed position.

FIG. 4 is an explanatory diagram showing the movement of the position where the sound image is localized. Although the speakers 118C to 118E described above are used for simplicity of description in FIG. 4, the position where the sound image is localized can be spatially moved using the speakers 118A to 118H provided in the vehicle interior. For example, when the sound image is localized at a spatial position MP1 determined by three-dimensional coordinates (X, Y, Z) shown in FIG. 4, the sound is perceived from a position of an occupant P1 so that a sound image is localized at the spatial position MP1 shown in FIG. 4 if the AMP 120 has provided an output of 5% of a maximum intensity from the speaker 118C, an output of 80% of a maximum intensity from the speaker 118D, and an output of 15% of a maximum intensity from the speaker 118E with respect to a sound of a prescribed output target on the basis of the sound generated by the sound generator 164.

If the AMP 120 has provided an output of 45% of a maximum intensity from the speaker 118C, an output of 45% of a maximum intensity from the speaker 118D, and an output of 10% of a maximum intensity from the speaker 118E with respect to a sound of an output target on the basis of the sound generated by the sound generator 164, the sound can be perceived from a position of the occupant P1 so that a sound image is localized at a spatial position MP2 shown in FIG. 4. In this manner, the position where the sound image is localized can be changed by adjusting a plurality of speakers provided in the vehicle interior and a volume of a sound output from each speaker. Hereinafter, a position MP in a space where the sound image is localized is referred to as a "sound image position MP".

The application calling device 166 calls an application corresponding to control details of the output controller 160 from the application stored in the storage 170, and executes the called application by the controller 180, thereby causing a function of the application to be implemented. For example, the application includes a telephone application 172, a radio application 174, a navigation application 176, and the like. When the telephone application 172 has been executed by the controller 180, communication with a terminal having an external communication function is performed via the communication device 110 and a function of communicating with the other party is implemented using the microphone 114 or the speaker 118. When the radio application 174 has been executed by the controller 180, a function of acquiring sound information transmitted from a radio station at a frequency specified by the occupant via the communication device 110 and outputting the acquired sound information from the speaker 118 is implemented. When the navigation application 176 has been executed by the controller 180, functions such as route search and route guidance in cooperation with the navigation device 140 are implemented.

The storage 170 is implemented by, for example, an HDD, a flash memory, an electrically erasable programmable read only memory (EEPROM), a read only memory (ROM), a random access memory (RAM), or the like. The storage 170 stores, for example, programs to be read and executed by a processor of the telephone application 172, the radio application 174, the navigation application 176, and the like, other information, and the like.

The controller 180 controls the execution and stopping of each functional unit of the agent control device 150. For example, the controller 180 receives a request from each functional unit through an application programming interface (API), selects a functional unit that executes a process based on the received request, and causes the selected functional unit to execute the process via the API. The controller 180 may implement the process of each functional unit of the agent control device 150 by executing an application (for example, an agent application).

For example, the controller 180 causes an aspect in which the sound image of the agent sound output by the sound generator 164 is localized to be changed when the travel environment of the vehicle M is changed or when the vehicle M is predicted to be changed in the future. Although an aspect in which the sound image is localized includes, for example, a sound image position, the time at which the sound image is localized, a moving speed of the sound image position, and the like may be included.

The controller 180 may cause a display aspect of the agent image generated by the image generator 162 to be changed when the travel environment of the vehicle M is changed or when the vehicle M is predicted to be changed in the future. Although a display aspect of the agent image is, for example, a display position of the agent image, a size, a shape, a color, and a moving speed of the agent image may be included. Through cooperation with the controller 180 and the output controller 160, guidance control of the line of sight of the driver due to movement of the agent image or the sound image position may be performed.

Server

The server 200 includes, for example, a communicator 210, a recognizer 220, a dialogue generator 230, and a storage 240. For example, these components are implemented by a computer processor such as a CPU executing a program (software). Some or all of these components may be implemented, for example, by hardware (a circuit unit including circuitry) such as LSI, an ASIC, an FPGA, or a GPU or may be implemented by cooperation between software and hardware. The program may be pre-stored in the storage 240 or stored in a removable storage medium (a non-transitory storage medium) such as a DVD or a CD-ROM. The program may be installed in the storage 240 when the storage medium is mounted in a drive device.

The communicator 210 communicates with the agent device 100 via the network NW using, for example, a cellular network, a Wi-Fi network, Bluetooth, DSRC, or the like. The communicator 210 receives a sound stream transmitted from the agent device 100. The communicator 210 transmits dialogue information such as a sound and an image generated by the dialogue generator 230 to the agent device 100.

The recognizer 220 analyzes a meaning of the sound from the sound stream received by the communicator 210. The recognizer 220 includes, for example, a sound section detector 222, a sound recognizer 224, and a natural language processor 226. The sound section detector 222 detects a sound section from the sound stream transmitted from the agent device 100. For example, the sound section detector 222 detects a sound section on the basis of the amplitude and zero crossing of a sound waveform in the sound stream. The sound section detector 222 may perform section detection based on sound/non-sound discrimination in units of frames based on a Gaussian mixture model (GMM). The sound section detector 222 may perform the sound section detection by means of a matching process with a database for detecting a sound section from feature information of the sound stream stored in the storage 240 or the like in advance.

The sound recognizer 224 recognizes the sound in the sound section detected by the sound section detector 222 and converts the sound into text information. The sound recognizer 224 may identify features of a speaker from the recognized sound. The features of the speaker include, for example, information about a sex, an age, whether the speaker is a driver, and whether the speaker is a passenger.

The sound recognizer 224 may perform the collation with a personal profile 242 stored in the storage 240 using the feature information obtained from the sound. In the personal profile 242, for example, personal information is associated with sound feature information. The feature information of the sound is, for example, information about a sound pitch, an intonation, a rhythm (a sound pitch pattern), a feature of a speaking style such as a pose, and feature quantities of Mel-frequency cepstral coefficients and the like. The feature information of the sound is, for example, information obtained by asking the occupant to utter a sound of a prescribed word or sentence or the like at the time of initial registration of the occupant and analyzing the uttered sound. The personal information includes, for example, a name, an address, an age, a hobby, and a previous usage history of the server 200. The name, the address, the age, and the hobby are set together with the sound feature information at the time of initial registration of the occupant, and then appropriately updated according to a setting change or the like. The sound recognizer 224 collates the feature information obtained from the sound with the feature information of the personal profile 242 stored in the storage 240, and recognizes personal information associated with matching feature information.

The natural language processor 226 executes natural language processing on text information generated by the sound recognizer 224 and recognizes a meaning of the text information. The natural language processing includes morphological analysis, syntax analysis, semantic analysis, context analysis, and the like. In the morpheme analysis, for example, the text information is divided into units of smallest meaningful expression elements and a part of speech or the like for each divided unit (morpheme) is analyzed. In the syntax analysis, for example, a sentence structure is analyzed on the basis of a morpheme obtained by the morpheme analysis. In the semantic analysis, for example, a group with meaning is determined on the basis of the syntax obtained by the syntax analysis. In context analysis, for example, the meaning is recognized in units of sentences or units of contexts.

The natural language processor 226 generates a command corresponding to an interpreted meaning. For example, when a meaning such as "How many kilometers to Tokyo Station?" or "How long will it take to get to Tokyo Station?" has been interpreted as an interpretation result, the natural language processor 226 generates a command replaced with standard text information "How far is the distance from here to Tokyo Station?". Thereby, it is possible to make it easier to obtain answer information even when there is a text change in the sound of the request. For example, the natural language processor 226 may recognize the meaning of text information using an artificial intelligence process such as a machine learning process using a probability or generate a command based on the interpretation result.

The natural language processor 226 refers to the command of the answer information DB 244 stored in the storage 240 using the generated command and acquires control details corresponding to a matching command FIG.

5 is a diagram illustrating an example of details of the answer information DB 244. In the answer information DB 244, for example, control details to be executed by the agent device 100 are associated with the command. The control details include, for example, information such as application execution and termination, device activation and termination, sound control, display control, and an interactive text format.

The natural language processor 226 extracts control details associated with the matching command. For example, when the command is "turn on radio", control details for executing the radio application are extracted. When a distance to Tokyo Station is acquired, the natural language processor 226 may refer to map information (not shown) stored in the storage 240 or an external device on the basis of position information of the vehicle M transmitted from the agent device 100, derive a travel distance from the vehicle position to Tokyo Station, replace "*" of the dialogue sound control "** [km] from here" with the derived travel distance, and generate text information for the sound output.

The dialogue generator 230 generates dialogue information for having a dialogue with the occupant on the basis of the control details acquired by the natural language processor 226. For example, the dialogue generator 230 generates a sound information (a sound stream) related to details (text information) obtained from the answer information DB 244 as the dialogue information. The sound information includes, for example, a sound of speaking from the agent image to the occupant. The dialogue generator 230 may generate an image, a video, text information, and the like related to display control or generate control information (for example, an application execution command) related to device control and include the generated information in the dialogue information. For example, when the answer obtained by the answer information DB 244 is "display control: displaying of an image of a route to Tokyo station", the dialogue generator 230 refers to the map information and generates an image of a route from a current position to Tokyo station.

When personal information obtained from the personal profile 242 has been obtained, the dialogue generator 230 may call a name of the occupant by sound on the basis of the personal information or generate sound information having a speaking style similar to that of the occupant. The dialogue generator 230 may acquire information related to the hobby of the occupant obtained from a personal profile and include the acquired information in the dialogue information. The dialogue generator 230 transmits the generated dialogue information to the agent device 100 via the communicator 210.

In the process of the recognizer 220 and the dialogue generator 230 described above, the recognizer 220 may initially analyze an input sound, determine whether or not the input sound includes a specific word such as a wake word, and perform the above-described process when the specific word is included.

The storage 240 is implemented by, for example, an HDD, a flash memory, an EEPROM, a ROM, a RAM, or the like. The storage 240 stores, for example, a personal profile 242, an answer information DB 244, other information, and the like.

Automated Driving Control Device

The automated driving control device 300 recognizes a physical object located near the vehicle M, a road shape, and the like on the basis of a sensor fusion process on detection results of some or all of the camera 111, a radar device (not shown) installed in the vehicle M, a light detection and ranging (LiDAR) finder (not shown), and the like and performs automated driving control under a situation in which automated driving can be executed on the basis of a recognition result. The automated driving is a process of driving the vehicle by controlling one or both of the steering and the speed of the vehicle without depending on a driving operation by the occupant getting into the vehicle M.

For example, the automated driving control device 300 determines a recommended lane on the basis of route information from the navigation device 140 in principle and generates a target trajectory along which the vehicle M travels in the determined recommended lane and the vehicle M will automatically travel in the future (without depending upon an operation of the driver) to cope with a surrounding situation of the vehicle M. The target trajectory includes, for example, a speed element. The automated driving control device 300 may set an automated driving event when generating the target trajectory. Automated driving events include a constant-speed traveling event, a following traveling event including a low-speed following traveling event, a lane change event, a branching event, a merging event, a takeover event, and the like. The automated driving control device 300 generates a target trajectory corresponding to the activated event.

The automated driving control device 300 determines a target speed and target acceleration for each prescribed sampling time (for example, about several tenths of a second [sec]) as speed elements of the target trajectory. The trajectory point may be a position at which the vehicle M is required to arrive at the sampling time for each prescribed sampling time. In this case, the target speed or the target acceleration is determined by the sampling time and an interval between trajectory points.

Then, the automated driving control device 300 controls the travel driving force output device or the brake device installed in the vehicle M on the basis of the speed element associated with the generated target trajectory. The travel driving force output device outputs a travel driving force (a torque) to driving wheels so as to cause the vehicle M to travel. The brake device outputs a brake torque according to a braking operation to each wheel. The automated driving controller 145 controls the steering device installed in the vehicle M in accordance with a degree of curvature of the target trajectory. The steering device drives the electric motor to change an orientation of the steering wheel.

When the automated driving is being executed, the occupant is in a state in which it is unnecessary to monitor surroundings. When the automated driving is not being executed by the automated driving control device 300, manual driving is executed according to an operation of the driver on a driving operation element (not shown). For example, the driving operation element includes an accelerator pedal, a brake pedal, a shift lever, a steering wheel, a steering wheel variant, a joystick, and other operation elements. A sensor configured to detect an amount of operation or the presence or absence of an operation is attached to the driving operation element, and a detection result thereof is output to the automated driving control device 300 or some or all of the travel driving force output device, the brake device, and the steering device. The automated driving control device 300 outputs information related to various types of control states described above to the agent device 100.

Agent Control Device

Figure 6:
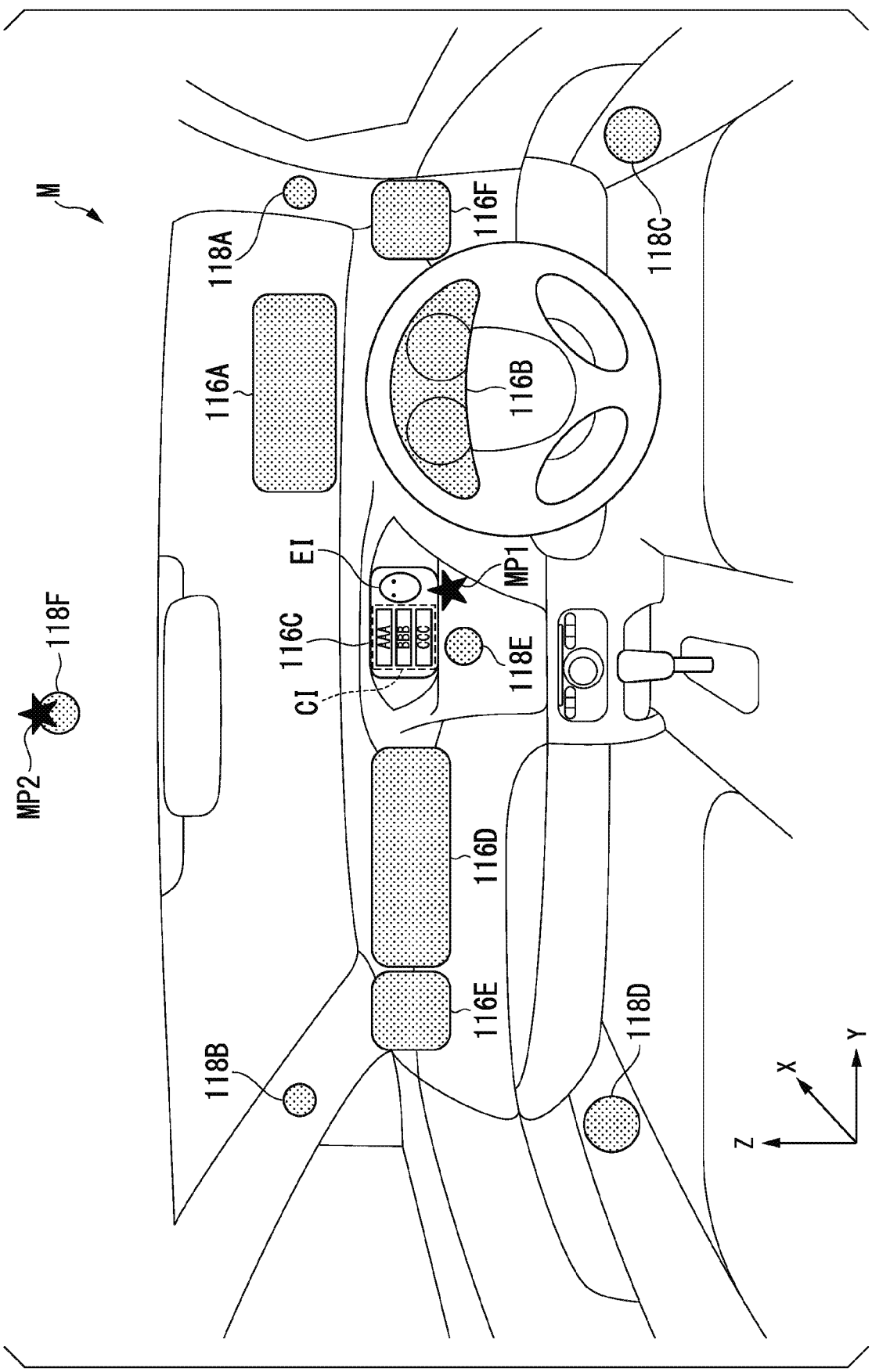
FIG. 6 is an explanatory diagram showing a process of an agent control device.

Hereinafter, details of the function of the agent control device 150 will be described. FIG. 6 is an explanatory diagram showing a process of the agent control device 150. FIG. 6 is an explanatory diagram showing a process of the agent control device 150 when the vehicle M is in manual driving and the vehicle M is stopped. The example of FIG. 6 shows an in-vehicle state similar to that of FIG. 2 described above.

For example, when a prescribed sound (for example, a wake word, a question item, or the like) has been received from the occupant, the output controller 160 or the controller 180 outputs an instruction for displaying an agent image of an aspect of speaking to the driver while the vehicle M is stopped and information about a display position (for example, a type of display and a display position (coordinates) on a display screen) to the image generator 162. The image generator 162 generates an agent image EI on the basis of control information from the output controller 160 or the controller 180, and causes the generated agent image to be displayed in an indicated region of at least a part of the display (for example, a region having an indicated display position as the center). In the example of FIG. 6, because the vehicle M is stopped and the necessity for the driver to perform monitoring in the traveling direction is low, the agent image EI is displayed in a region on the right side of the screen of the display 116C so that the driver and other occupants can visually recognize the stopping of the vehicle M and the low necessity of the monitoring. When a dialogue with an identified occupant such as an occupant sitting in the passenger seat or the like is performed, the agent image may be displayed on a display (for example, the display 116D if the occupant sits on the passenger seat) close to the seat in which the occupant having the dialogue sits according to control of the output controller 160 or the controller 180.

When a prescribed sound from the occupant has been received, the output controller 160 or the controller 180 outputs an instruction for outputting an agent sound to the sound generator 164 and information about a sound image localization position of the agent sound to the sound generator 164. The sound generator 164 generates an agent sound on the basis of control information from the output controller 160 or the controller 180 and causes the generated agent sound to be output from a prescribed speaker 118 by the AMP 120 or the mixer 122 performing adjustment so that a sound image is localized at an indicated position. In the example of FIG. 6, the agent sound is output by localizing a sound image at a three-dimensional sound image position MP1 near a display position of the agent image EI (for example, within several centimeters [cm] from the display position). Thereby, the occupant can intuitively perceive the agent sound as if the agent image EI is uttering the agent sound.

The controller 180 may cause the sound image to be localized at a position different from the sound image position MP1 of the agent sound when a sound other than the agent sound is output from the speaker 118. For example, when a radio sound output by the radio application 174 or a sound of content such as a video or music is output, the controller 180 causes the sound image to be localized at the sound image position MP2 near the ceiling in the vehicle interior as shown in FIG. 6. Thereby, a radio sound, a content sound, or the like can be widely heard by all occupants present in the vehicle interior.

As described above, the output controller 160 or the controller 180 adjusts the sound image position on the basis of details (a genre or a category) of the sound to be output. Sound image positions of a radio sound, a content sound, and the like may be set by the occupant's selection.

When the occupant has spoken to the agent about a request such as a question, the agent control device 150 acquires answer information thereof and outputs the answer information by image or sound. Specifically, a sound including the question from the occupant is collected by the microphone 114 and transmitted to the server 200. When the server 200 can analyze a meaning of the question included in the received sound and acquire dialogue information (for example, image information) corresponding to the meaning, the server 200 transmits the acquired image information (hereinafter referred to as an answer image CI) to the agent device 100. The output controller 160 of the agent device 100 outputs the answer image CI from the server 200 and information for specifying a type of display 116 and a display position for displaying the answer image CI to the image generator 162.

The image generator 162 performs size conversion and format conversion for displaying the answer image CI on the specified display 116 and causes the converted information to be displayed in at least a partial region of the specified display 116. The answer image CI may be generated by the image generator 162 on the basis of information obtained from the server 200. In the example of FIG. 6, the answer image CI is displayed in a left region of a screen of the display 116C. For example, the controller 180 may cause the answer image CI to be displayed on a display close to the occupant's line-of-sight position detected by the line-of-sight detector 156 or may cause the answer image CI to be displayed near the display position of the agent image EI.

Figure 7:
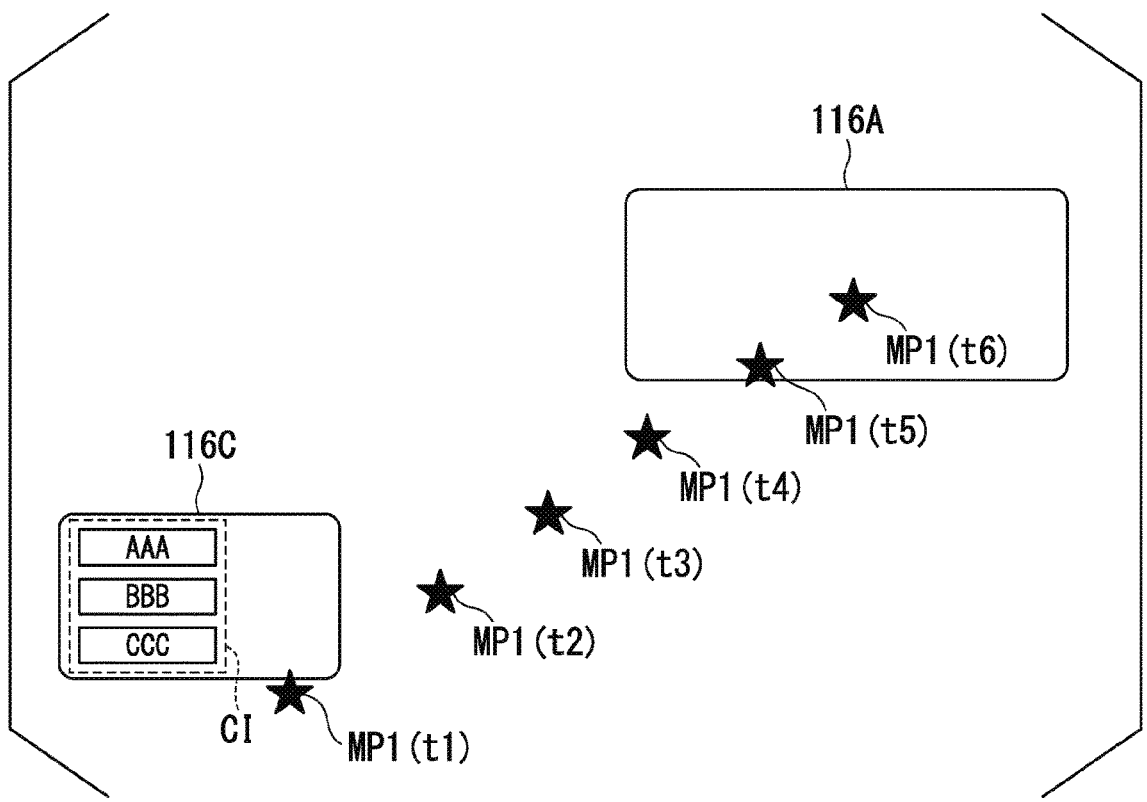
FIG. 7 is an explanatory diagram showing a state in which an aspect of localization of a sound image of an agent sound is changed.

Here, when the environment change determiner 155 determines that the travel environment of the vehicle M has been changed, the controller 180 causes an aspect in which the sound image of the agent sound is localized to be changed. FIG. 7 is an explanatory diagram showing a state in which an aspect of localization of the sound image of the agent sound is changed. In the following description, it is assumed that the relationship of "t1<t2<t3<t4<t5<t6" is established for times t1 to t6.

For example, when the environment change determiner 155 has predicted that the vehicle M will transition from a stopped state to a traveling state or will be in the traveling state in the future, the controller 180 causes the sound image position MP to be moved so that the line of sight of the occupant is in a traveling direction of the vehicle M or in a direction in which the vehicle M is predicted to travel in the future. In the example of FIG. 7, the vehicle M is assumed to travel in a forward direction. In this case, the sound image is localized near the display 116A installed at a position close to a field of view when the driver monitors surroundings of the vehicle M rather than near the display 116C so that the sound image is localized near a line-of-sight position for performing monitoring in the forward direction.

The controller 180 may cause the sound image position of the output agent sound image to be gradually moved during a period from time t1 to time t6. Time t6 is, for example, the time at which the vehicle M should be driven by manual driving or the time that is a prescribed period of time earlier than the time at which the vehicle M should be driven. For example, the controller 180 first determines time t6 on the basis of the travel environment and sets a moving speed for moving the sound image position MP and sound image positions MP(t1) to MP(t5) at times t1 to t5 on the basis of the determined time t6. Thereby, it is possible to guide the driver to move his/her line of sight in the direction in which the sound is output. As a result, the driver can face the traveling direction of the vehicle M. The sound output during the movement of the sound image position MP may be a sound during the dialogue, a message sound for prompting the occupant to perform manual driving such as a message sound "It's about time to start driving" or "Signal has been changed to green" in correspondence with details of a change in the travel environment, or a warning sound for prompting the occupant to pay attention. The sound switching control is also controlled by the controller 180.

The controller 180 performs control so that only the agent sound is output without displaying the agent image while the vehicle M is traveling. Thereby, the driver's line of sight can be arranged in the monitoring direction (the forward direction).

Figure 8:
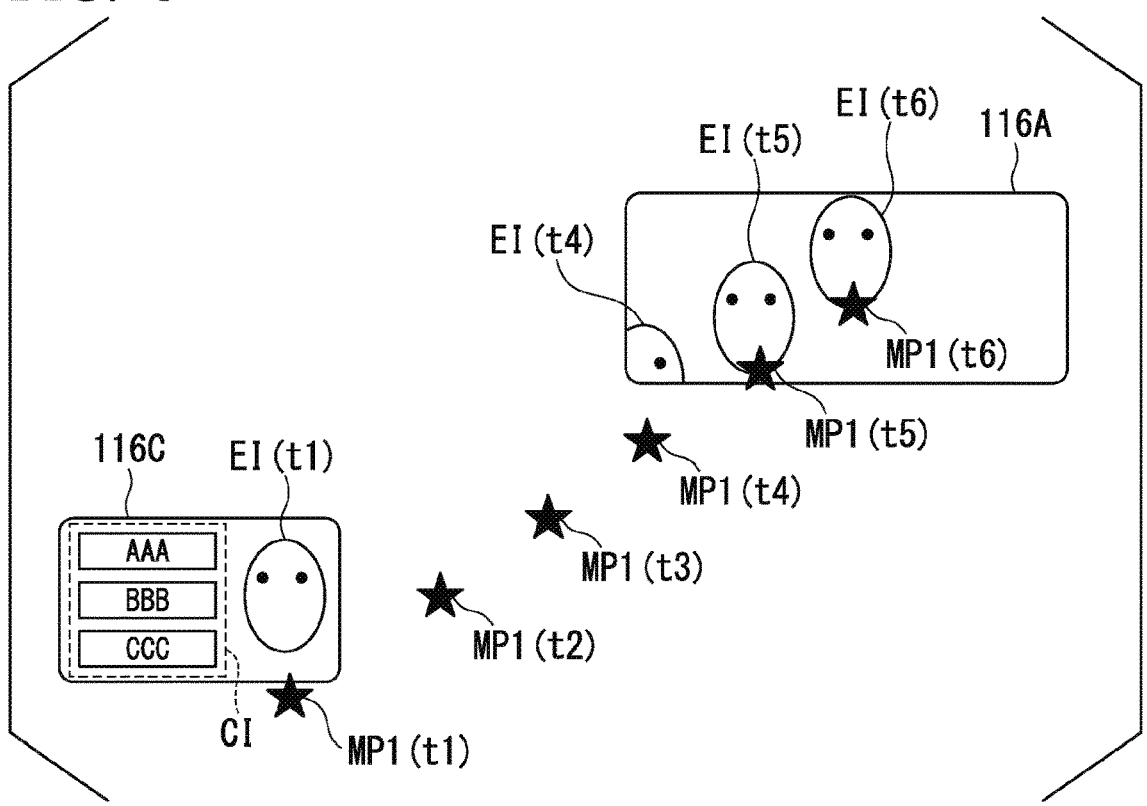
FIG. 8 is an explanatory diagram showing a state in which the agent image is moved in association with the movement of a sound image localization position.

In the case of movement to the sound image positions MP(t1) to MP(t6) of the agent sound, the controller 180 may cause the display position of the agent image E1 displayed on the display 116C to be moved in association with the movement of the sound image position MP1 to be localized. FIG. 8 is an explanatory diagram showing a state in which the agent image is moved in association with the movement of a sound image localization position. In the following description, EI(t*) denotes a position of an agent image displayed at time t* and MP1(t*) denotes a sound image position at time t*. For example, when the agent sound image position MP1 is moved on the basis of a change in the travel environment, the controller 180 causes the agent image EI to be moved in synchronization with the sound image positions MP1(t1) to MP1(t6) that are moving as in the agent images EI(t1) to EI(t6). For example, when the sound image position MP1 is moved from the vicinity of the display 116C to the vicinity of the display 116A, the controller 180 controls the image generator 162 so that the agent image E1 is displayed on the displays 116C and 116A at respective timings. As shown in FIG. 8, the image generator 162 displays the agent image E1 so that the agent image EI fades out from the display 116C toward the display 116A, fades in from the end of the display 116A, and is displayed at a prescribed position.

In this manner, it is possible to guide the occupant to move his/her line of sight more reliably when an agent image as well as an agent sound is moved than when only the sound image position MP1 is moved. First, after only the sound image position is moved or in a state in which only the sound image position is moved, the controller 180 may control movement of the agent image E1 when a position of the line of sight of the driver detected by the line-of-sight detector 156 is not moved in a sound image movement direction.

When switching from the manual driving to the automated driving of the automated driving control device 300 has been performed, the controller 180 may cause the sound image position MP1 of the agent sound to be moved from a position near the display 116A to the vicinity of a position at which the answer image CI is displayed in contrast to an example shown in FIG. 7 or 8. In this case, the controller 180 may control a display position of the agent image EI and a sound image position MP on the basis of the driver's line-of-sight position detected by the line-of-sight detector 156.

Figure 9:
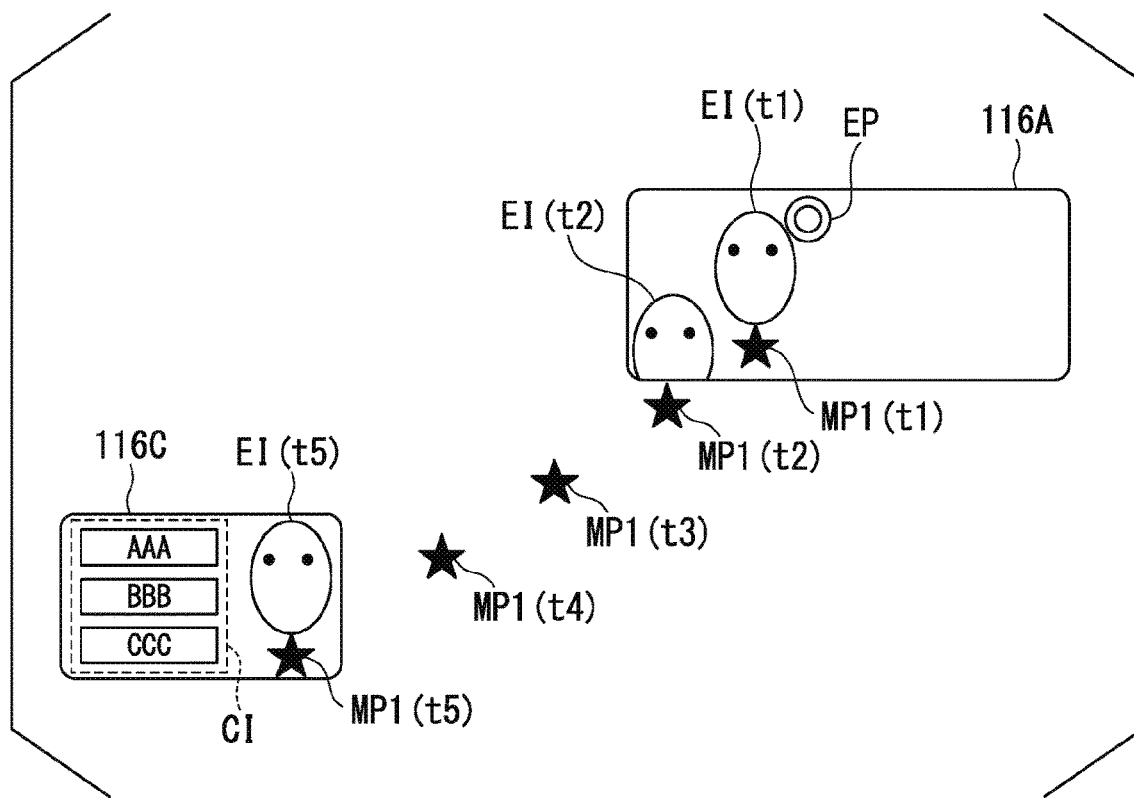
FIG. 9 is an explanatory diagram showing a process of a controller based on a line-of-sight position.

FIG. 9 is an explanatory diagram showing a process of the controller 180 based on the line-of-sight position. For example, when the agent image EI is generated by the image generator 162, the controller 180 adjusts the display position of the agent image on the basis of the driver's line-of-sight position detected by the line-of-sight detector 156. For example, when a line-of-sight position EP of the driver is within the display 116A as shown in FIG. 9, the controller 180 adjusts the position of the agent image EI1 displayed by the image generator 162 to a position associated with the line-of-sight position EP of the driver. For example, the controller 180 controls the image generator 162 so that the agent image EI is displayed near the line-of-sight position EP (for example, within a range of about 3 to 5 [cm] with the line-of-sight position as the center). The controller 180 controls the sound generator 164 so that the sound image is localized at a position associated with the agent image EI displayed near the line-of-sight position EP.

The controller 180 determines whether or not the answer image CI has been visually recognized on the basis of the line-of-sight position EP of the occupant. For example, when a distance between the line-of-sight position EP and the answer information is greater than or equal to a prescribed distance or when a display located at a position corresponding to the line-of-sight position EP is different from a display on which the answer image CI is displayed, the controller 180 determines that the answer image CI has not been visually recognized. When it is determined that the answer image CI has not been visually recognized, the controller 180 executes control for moving the display position of the agent image EI or the sound image position MP1 of the agent sound so that the line-of-sight position EP is moved to the display position of the answer image CI. In this case, first, the controller 180 causes the agent image EI(t1) to be displayed in the vicinity of the line-of-sight position EP of the occupant before the answer image CI is displayed by means of the image generator 162 and causes a sound output from the speaker 118 to be localized at the sound image position MP1(t1) by means of the sound generator 164. Next, the controller 180 causes the display position of the agent image EI and the sound image position MP1 of the agent sound to be moved toward the display position of the answer image CI, causes the agent image EI(t5) to be displayed near the answer image CI at time t5, and causes the sound to be localized at the sound image position MP1(t5). Thereby, because a process of guiding the driver to move his/her line of sight is performed on the basis of a current line-of-sight position, it is possible to reduce the burden of line-of-sight movement of the driver.

The controller 180 may continuously detect the line-of-sight position EP of the driver even while the display position of the agent image EI or the sound image position MP1 of the agent sound is being moved and perform line-of-sight guidance control by positioning the display position of the agent image EI or the sound image position MP1 of the agent sound at the line-of-sight position EP again when the line-of-sight position EP does not follow the movement of the agent image EI or the sound image position MP1. In this case, for example, the controller 180 may change a facial expression of the agent image EI, enlarge the image, change the color, or slow down the moving speed of the sound image position MP. Thereby, it is possible to reliably easily position the line of sight of the driver at the display position of the answer information CI.

Figure 10:
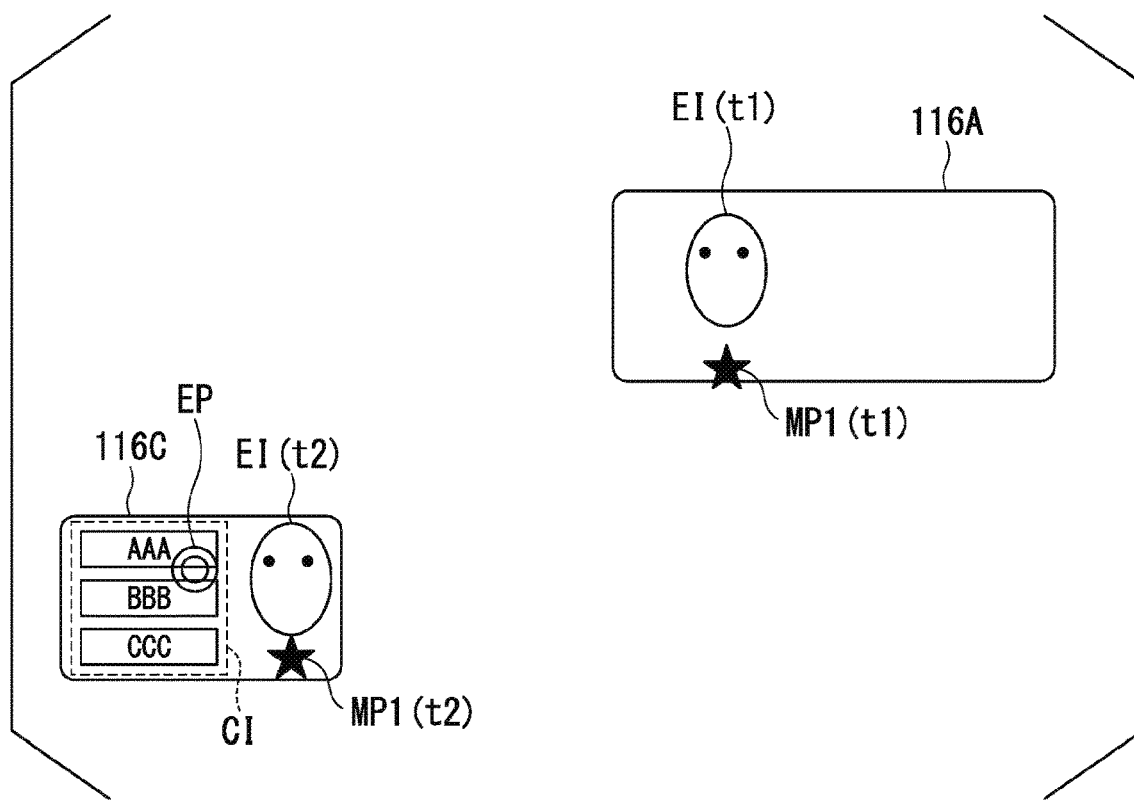
FIG. 10 is an explanatory diagram showing a scene in which there is an answer image near the line-of-sight position.

When the line-of-sight position of the driver exists in the vicinity of the answer image CI before line-of-sight guidance based on the display position of the agent image EI or the sound image position MP1 of the agent sound is performed, the controller 180 may not perform line-of-sight guidance control based on the agent image EI or the sound image position MP1. FIG. 10 is an explanatory diagram showing a scene in which an answer image exists near the line-of-sight position.

For example, after the vehicle M is switched from manual driving to automated driving, the controller 180 estimates that the driver can visually recognize the answer image CI and controls the image generator 162 so that the agent image EI(t2) is displayed according to switching from the agent image EI(t1) to the agent image EI(t2) when the line-of-sight position EP of the driver already exists in the vicinity of the answer image CI. The controller 180 causes the localization from the sound image position MP1(t1) to the sound image position MP1(t2) to be performed in accordance with the switching of the agent image.

In this manner, the controller 180 can appropriately control the display position and the sound image position of the agent image in accordance with the line-of-sight position EP of the driver.

When the automated driving is continued, the controller 180 does not perform control for moving the sound image position of the agent sound and the display position of the agent image if the occupant does not need to monitor surroundings even when the state of the vehicle M is switched between the stopped state and the traveling state.

Processing Flow

Figure 11:
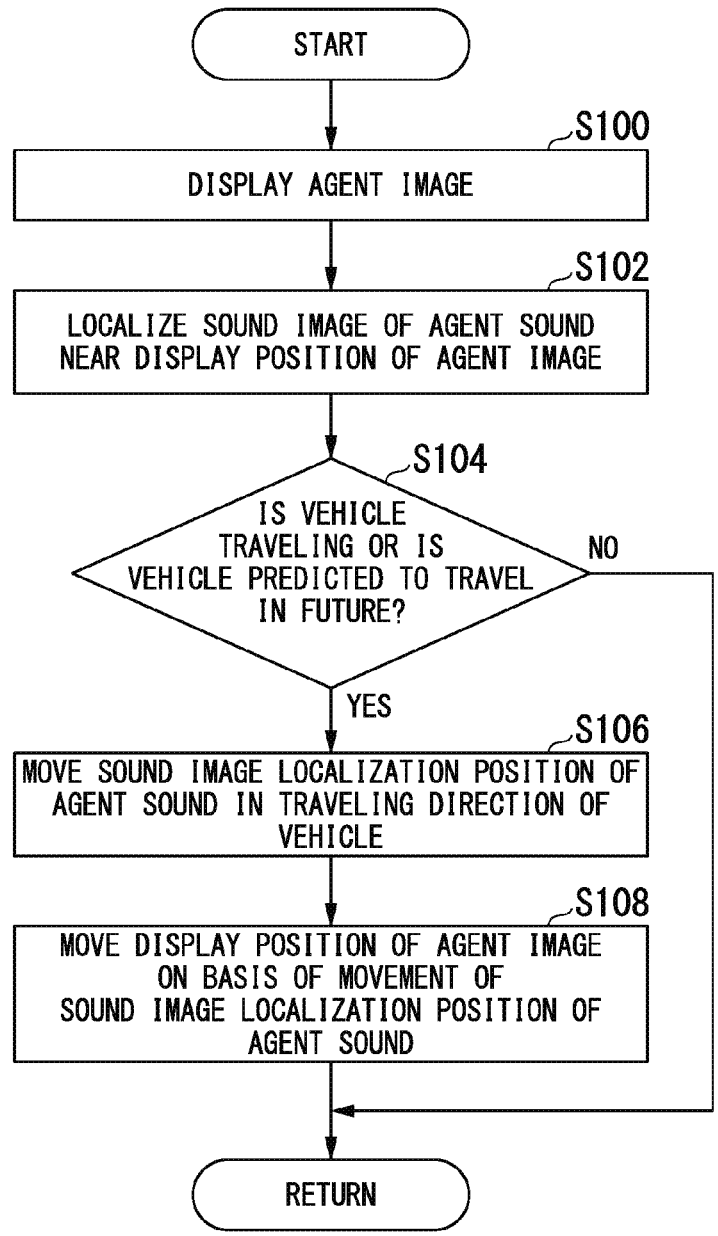
FIG. 11 is a flowchart showing an example of a flow of a series of processing steps of an agent system.

Hereinafter, a flow of a series of processing steps of the agent system 1 will be described using a flowchart. FIG. 11 is a flowchart showing an example of the flow of the series of processing steps of the agent system 1. In FIG. 11, the flow of processing in which the agent system 1 mainly guides the occupant to move the line of sight using an agent sound or an agent image will be described. An example of the line-of-sight guidance for the driver when the environment of the vehicle M is manual driving and is changed from a stopped state to a traveling state will be described with reference to FIG. 11. For example, a process of the present flowchart may be iteratively executed at a prescribed cycle.

First, the image generator 162 causes the display to display an agent image according to control of the output controller 160 or the controller 180 (step S100). Next, the sound generator 164 causes the sound image of the agent sound to be localized near the display position of the agent image according to control of the output controller 160 or the controller 180 (step S102).

Here, the controller 180 determines whether or not the vehicle M is traveling or is predicted to travel in the future on the basis of a determination result from the environment change determiner 155 (step S104). When it is determined that the vehicle M is traveling or is predicted to travel in the future, the sound generator 164 causes the sound image localization position of the agent sound to be moved in the traveling direction of the vehicle M (the line-of-sight direction of the driver who monitors the surroundings) (step S106). Next, the image generator 162 causes the display position of the agent image to be moved in association with the movement of the sound image localization position of the agent sound (step S108). Thereby, the process of the present flowchart ends. When it is determined that the vehicle M is not traveling or is not predicted to travel in the future in the processing of step S104, the process of the present flowchart ends.

According to the embodiment described above, driving support for the occupant can be performed more appropriately by controlling the sound image localization position on the basis of the travel environment of the vehicle. Specifically, the agent device 100 can have a dialogue or the like with the occupant by causing a display easily viewed by the occupant to display an agent image, an answer image, or the like or causing a sound image of an agent sound to be localized in accordance with the agent image when the vehicle M is in manual driving and is in a stopped state and can cause a line of sight to be moved in a direction in which surroundings are monitored by causing a sound image localization position of the agent sound or a display position of the agent image to be moved in a direction in which the driver monitors surroundings when switching from the stopped state to the traveling state is performed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. For example, some or all of the components of the server 200 according to the above-described embodiment may be provided within the agent device 100. Some or all of the components of the agent device of the above-described embodiment may be provided within the server 200. The agent device 100 may acquire an answer to the occupant's request in cooperation with another agent device and provide the obtained answer to the occupant.

What is claimed is:

1. An agent system comprising:
a microphone configured to collect a sound of a vehicle interior;
a speaker configured to output a sound to the vehicle interior;
a recognizer configured to recognize a meaning of the sound collected by the microphone;
an agent controller configured to generate an agent sound for speaking to an occupant of a vehicle based on the meaning recognized by the recognizer and cause the agent sound to be output to the speaker so that a sound image of the generated agent sound is localized at a prescribed position,
a display configured to display an image; and
a travel environment acquirer configured to acquire a travel environment of the vehicle,
wherein the display includes at least a first display and a second display disposed at a position closer to a field of view, wherein the occupant monitors surroundings of the vehicle using the second display rather than the first display,
wherein the agent controller causes an agent image displayed on the first display to be moved to the second display and causes a sound image localization position of the agent sound to be moved in association with movement of the agent image when the vehicle is traveling or is predicted to travel in the future based on the travel environment of the vehicle.

2. The agent system according to claim 1, wherein the agent controller causes the agent sound to be moved in a traveling direction of the vehicle when the vehicle is traveling or is predicted to travel in the future based on the travel environment of the vehicle acquired by the travel environment acquirer.

3. The agent system according to claim 2, wherein the agent controller causes a display position of the agent image displayed on the display to be moved in association with movement of a sound image localization position when the sound image localization position of the agent sound is moved in the traveling direction of the vehicle.

4. An agent system comprising:
a microphone configured to collect a sound of a vehicle interior;
a speaker configured to output a sound to the vehicle interior;
a recognizer configured to recognize a meaning of the sound collected by the microphone;
an agent controller configured to generate an agent sound for speaking to an occupant of a vehicle based on the meaning recognized by the recognizer and cause the agent sound to be output to the speaker so that a sound image of the generated agent sound is localized at a prescribed position,
a display configured to display an image; and
a travel environment acquirer configured to acquire a travel environment of the vehicle,
wherein the display includes at least a first display and a second display disposed at a position closer to a field of view, wherein the occupant monitors surroundings of the vehicle using the second display rather than the first display,
wherein the agent controller causes the agent image displayed on the second display to be moved toward the first display and causes a sound image localization position of the agent sound to be moved in association with movement of the agent image when the vehicle has been switched from manual driving to automated driving by means of the travel environment acquirer.

* * * * *